US00RE33853E

United States Patent [19]

Okoshi et al.

[11] E Patent Number: Re. 33,853

[45] Reissued Date of Patent: Mar. 24, 1992

[54] PIGMENT PASTE

[75] Inventors: Noboru Okoshi, Sodegaura; Masatoshi Motomura, Ichihara; Mitsuru Ohtsubo, Kisarazu; Takenori Ikeda, Ichihara, all of Japan

[73] Assignee: Dainippon Ink and Chemicals, Inc., Tokyo, Japan

[21] Appl. No.: 452,616

[22] Filed: Dec. 18, 1989

Related U.S. Patent Documents

Reissue of:

[64] Patent No.: 4,071,023
Issued: Dec. 1, 1987
Appl. No.: 854,398
Filed: Apr. 21, 1986

[30] Foreign Application Priority Data

Apr. 25, 1985 [JP] Japan ..... 60-89286

[51] Int. Cl.[5] ..... C09B 67/50

[52] U.S. Cl. ..... 106/413; 106/400; 524/597; 544/194

[58] Field of Search ..... 106/400, 413; 524/597; 544/194

[56] References Cited

U.S. PATENT DOCUMENTS

| | | | |
|---|---|---|---|
| 3,310,416 | 3/1967 | Schibler | 106/285 |
| 3,538,026 | 11/1970 | Standish et al. | 524/597 |
| 3,884,711 | 5/1975 | Varsanyi et al. | 106/271 |
| 3,887,552 | 6/1975 | Stähle et al. | 544/194 |
| 4,137,213 | 1/1979 | Kempter et al. | 260/39 |
| 4,247,692 | 1/1981 | Sinnige et al. | 544/194 |
| 4,314,001 | 2/1982 | Wesseler | 106/413 |
| 4,369,070 | 1/1983 | Aign et al. | 106/308 N |
| 4,442,177 | 4/1984 | Noda et al. | 524/597 |

*Primary Examiner*—William R. Dixon, Jr.
*Assistant Examiner*—Willie Thompson
*Attorney, Agent, or Firm*—Sherman and Shalloway

[57] ABSTRACT

A pigment paste comprising a pigment and as a pigment dispersing agent, a compound having a basic structure represented by the following formula

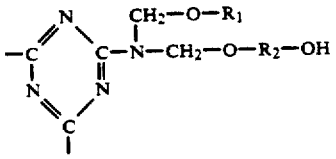

wherein $R_1$ represents a hydrogen atom or a $C_1$-$C_4$ alkyl group, and $R_2$ represents a residue of a diol or polyol, or a mixture of said pigment dispersing agent and an organic solvent, said pigment being dispersed in said pigment dispersing agent or in said mixture.

12 Claims, No Drawings

PIGMENT PASTE

Matter enclosed in heavy brackets [ ] appears in the original patent but forms no part of this reissue specification; matter printed in italics indicates the additions made by reissue.

This invention relates to a novel and useful pigment paste. More specifically, this invention relates to a tinting pigment paste comprising a specific triazine compound as a pigment dispersing agent and is used mainly for paints and inks.

A pigment paste composed of a pigment dispersed in a pigment dispersing agent or a mixture of a pigment dispersing agent and an organic solvent has been used widely for coloring paints or inks of the solvent solution type. Now, there are many pigment pastes for use in paints or inks known according to various uses or desired properties, and pigment dispersing agents suited for such various paints and inks are also known. Paint or ink manufacturers are therefore required to stock various pigment pastes for the desired colors, such as white, black, red, blue or yellow, of a variety of paints and inks. This is by no means easy in practice primarily because of limited available spaces for stocking. Accordingly, it is advantageous to have a few necessary pigment pastes in stock, and match colors according to the desired colors every time a specific paint or ink is to be prepared.

In the preparation of many kinds of paints or inks using one or a few pigment pastes, the poor compatibility of the pigment dispersing agents in the pigment pastes with binder resins used in the preparation of paints or inks would naturally reduce the tinting strength and gloss of the final paints or inks. For this reason, much work has been done in the past on the preparation of pigment pastes by the use of minimum amounts of pigment dispersing agents fully compatible with various binder resins for paints or inks, and on pigment dispersing aids which would serve for the same purpose.

However, in the preparation of such pigment pastes which may be said to be specialties, the decrease of the amounts of the pigment dispersing agents rather causes a rise in the viscosity of the pigment pastes and makes it difficult to handle the pigment pastes and in turn, paints or inks to be produced. Furthermore, the stability of the dispersions is reduced, and in the preparation of paints or inks by diluting the pigment pastes with vehicle components such as binder resins or solvents, the pigments tend to flocculate owing to "shock". Consequently, undesirable phenomena such as the reduction of the tinting strength or luster of the final paints or inks will occur.

Such resins as maleic rosin ester and the pigment dispersing aids described, for example, in Japanese Laid-Open Patent Publication No. 145762/1983, which are generally used in an attempt to achieve the aforesaid purpose, act as plasticizing components in cured coated films or cured ink films from various paints or inks curable by a crosslinking reaction even if they are used in small amounts. Accordingly, they adversely affect the properties of such coated films or ink films.

In view of the aforesaid state of the art, the present inventors worked extensively in search of a pigment paste which has superior compatibility with binder resins of paints or inks, can be applied to various paints or inks and can be a crosslinking component in cured coated films or cured ink films, and particularly a pigment paste which is effective for color matching using multiple pigments. The work of the inventors has led to the discovery that the use of a specific compound derived from hexamethoxymethylolmelamine as a pigment dispersing agent gives a useful pigment paste having the desirable properties.

According to this invention, there is provided a pigment paste comprising a pigment and as a pigment dispersing agent, a compound having a basic structure represented by the following formula

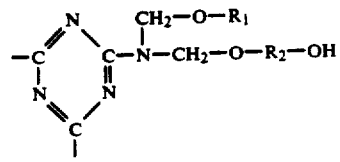

wherein $R_1$ represents a hydrogen atom or a $C_1$–$C_4$ alkyl group, and $R_2$ represents a residue of a diol or polyol, or a mixture of said pigment dispersing agent and an organic solvent, said pigment being dispersed in said pigment dispersing agent or in said mixture.

Examples of the pigment used in this invention include organic pigments such as soluble and insoluble azoic pigments, condensed azoic pigments, phthalocyanine pigments, quinacridone, pigments, isoindolinone pigments, perylene pigments, perinone pigments, dioxazine pigments, vat dyed pigments and basic dyed pigments; and inorganic pigments such as carbon black, titanium oxide, chrome yellow, cadmium yellow, cadmium red, iron oxide red, black iron oxide, zinc white, prussian blue and ultramarine blue. These pigments may be used alone or in combination.

The pigment paste of this invention can be properly prepared by kneading the pigment dispersing agent of formula [I], with or without a suitable amount of an organic solvent, with the pigment in such an amount that the pigment weight concentration (PWC, weight %), defined below, is 0.5 to 99.5% by weight.

$$PWC(\%) = \frac{\text{Weight of the pigment}}{\text{Weight of the pigment dispersing agent + solids weight of the pigment}} \times 100$$

Pigments having a high hiding power such as organic pigments, carbon black, prussian blue and ultramarine blue preferably have a PWC in the range of 30 to 60%, and those inorganic pigments which have good dispersibility preferably have a PWC in the range of 50 to 90%. Needless to say, maximization of PWC during kneading is economical.

The compound having the basic structure of general formula [I] can be obtained by co-condensing a triazine-type amino compound, formaldehyde, a diol and a monohydric alcohol.

Typical examples of the triazine-type amino compound are melamine, benzoguanamine and acetoguanamine. Formoguanamine, propioguanamine and isopropylguanamine can also be used. These compounds may be used singly or in combination.

Since the triazine-type amino compound is generally synthesized from dicyan diamide and a nitrile compound [for example, Nomura, Yoshida, Kakurai and Noguchi: "Organic Synthetic Chemistry", Vol. 24, No. 2, page 125 (1966)], various compounds having different substituents are obtained depending upon the kind of the nitrile compound.

It is well known that the triazine-type amino compound react with formaldehyde to form a trimethylol compound, and the upper molar amount of formaldehyde to be reacted is determined depending upon the number of the amino groups in the triazine-type amino compound. In this reaction, 2 moles of formaldehyde adds to 1 amino group to form 2 methylol groups. Let the number of the amino groups bonded to the triazine ring be n (for example, n=2 in the case of a guanamine, and n=3 in the case of a melamine), up to 2n moles of formaldehyde add to the triazine-type amino compound by this reaction.

The suitable amount of formaldehyde used is n to 20n moles per mole of the triazine-type amino compound. If it is less than n moles, the reactivity of formaldehyde with the diol and monohydric alcohol is undesirably reduced. If it exceeds 20n moles, the amount of free formaldehyde (the unreacted component) in the resulting co-condensate (triazine ring-containing polyol) increases undesirably. The especially preferred amount of formaldehyde is in the range of 2n+1 moles.

As required, it is possible to use further another aldehyde such as acetaldehyde, propionaldehyde, glyoxal, succinic aldehyde or chloral in addition to formaldehyde.

Typical examples of the diol are ethylene glycol, propylene glycol, diethylene glycol, dipropylene glycol, polyethylene glycol, polypropylene glycol, butanediol, pentanediol, neopentyl glycol, hexanediol, 2,2,4-trimethyl-1,3-pentanediol, bisphenols, hydrogenated bisphenols, and halogenated bisphenols. Adducts of the various diols cited above and alkylene oxides, and polyester diols obtained by the reaction of various diols or bisphenols with polybasic acids may also be used.

These diols may be used in combination with trihydric or higher alcohols such as glycerol, trimethylolethane, trimethylolpropane, pentaerythritol, dipentaerythritol and sorbitol; adducts of these polyhydric alcohols and alkylene oxides; and polyesters obtained by the reaction of diols, trihydric or higher alcohols or bisphenols with polybasic acids.

Hydroxy-containing fatty acid ester polyols (such as alcoholysis products of various oils and fats with various polyols), esterification reaction products of various higher fatty acids with various polyols or epoxy compounds, and castor oil can also be used. Alkyd polyols obtained by reacting the aforesaid polyols with fatty acids and polycarboxylic acids may further be used. Typical examples of the fatty acids are fatty acids obtained from natural oils and fats such as coconut oil fatty acid, castor oil fatty acid, safflower oil fatty acid, soybean oil fatty acid, rice bran oil fatty acid or tall oil fatty acid, and synthetic fatty acids such as Versatic acid or "PALMOLYN" (a tradename for a product of Hercules Company, U.S.A.). Typical examples of the polycarboxylic acids include phthalic anhydride, isophthalic acid, terephthalic acid, trimetllitic acid, tetrahydrophthalic anhydride, hexahydrophthalic anhydride and adipic acid. Benzoic acid or tert-burylbenzoic acid may permissibly be used together.

Acrylic polyols obtained by copolymerizing radical-polymerizable monomers such as styrene, methyl methacrylate, butyl methacrylate and acrylonitrile and hydroxy-containing radical-polymerizable monomers such as beta-hydroxyethyl methacrylate may also be used.

Typical examples of the monohydric alcohol are methanol, ethanol, propanol and butanol. If required, aliphatic alcohols such as amyl alcohol and octanol, alicyclic alcohols such as cyclohexanol, aromatic alcohol such as benzyl alcohol, and various ether alcohols (Cellosolves) such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, and tetrahydrofurfuryl alcohol may also be used.

Typical examples of the compound having the basic structure of general formula [I] obtained by using the various materials cited above (the pigment dispersing agent used in this invention) are shown below.

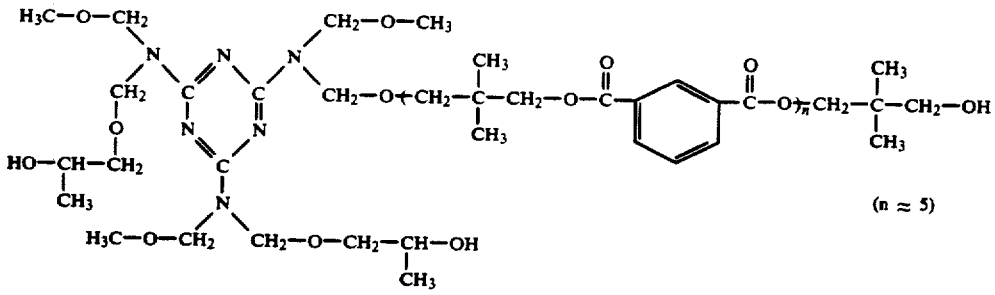

(n ≈ 5)

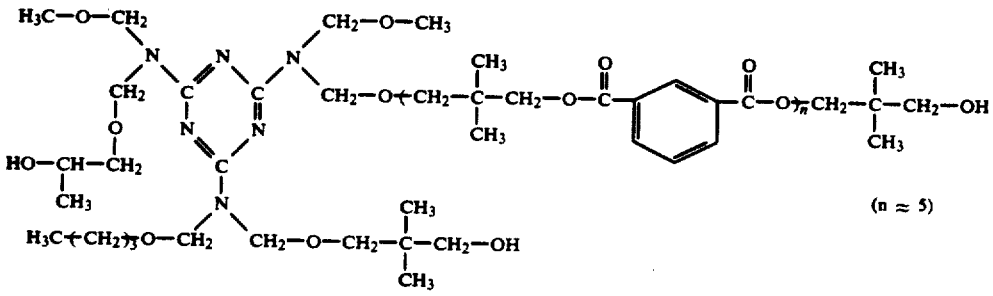

(n ≈ 5)

-continued

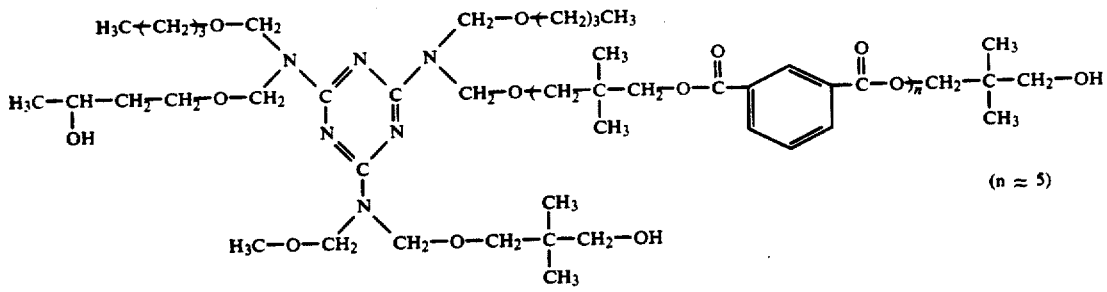

(n ≈ 5)

The suitable average molecular weight of the derivative (the pigment dispersing agent used in this invention) of the triazine-type amino compound, which has the basic structure (partial structure) of formula [I] is 550 to 3,000, preferably 1,500 to 2,500. If it exceeds 3,000, the compatibility of the pigment dispersing agent with binder resins is reduced. Hence, the range of miscible binder resins is limited, and the desired pigment paste which can be used for various paints or inks cannot be obtained.

The suitable hydroxyl value of the pigment dispersing agent used in this invention is 20 to 400, preferably 80 to 160. If it is lower than 20, sufficient crosslinking does not take place at the time of urethanization reaction between an isocyanate as a curing agent and the hydroxyl groups of the pigment dispersing agent when the pigment paste is used in an isocyanate-curable paint or ink. Consequently, an excellent cured coated film or ink film cannot be formed. If it is higher than 400 and the pigment paste is used in a melamine-curable paint or ink, the amount of the hydroxyl groups of the pigment dispersing agent becomes much rather than the hydroxyl groups of the binder resin, and sufficient crosslinking does not take place at the time of dealcoholization reaction between the alkoxy groups of the pigment dispersing agent and the hydroxyl groups of the binder resin and the hydroxyl groups of the pigment dispersing gent, and consequently, a superior cured coated film or ink film cannot be obtained.

When the paste cannot be formed from the pigment and the pigment dispersing agent, a suitable amount of an organic solvent is desirably used together.

The organic solvent is preferably one which does not contain functional groups (e.g., the hydroxyl, amino, carboxyl or epoxy group) which crosslink with binder resins in paints or inks. Typical examples are aromatic hydrocarbon solvents such as toluene, xylene, solvent naphtha, aliphatic hydrocarbon solvents such as hexane and mineral spirit, alicyclic hydrocarbon solvents such as cyclohexane and ethylcyclohexane, ester solvents such as ethyl acetate, butyl acetate and Cellosolve acetate; and ketone solvents such as acetone, methyl ethyl ketone, methyl isobutyl ketone and isophorone.

The pigment paste of this invention can be prepared by preliminarily mixing the pigment and the pigment dispersing agent with or without the organic solvent and other optional components, and treating the mixture in a conventional dispersing machine such as a roll mill, a colloid mill, a ball mill or an attriter to disperse the pigment.

The following Referential Examples, Examples, Application Examples and Comparative Application Examples illustrate the present invention more specifically. Unless otherwise specified, all parts and percentages are by weight.

It should be understood that the pigment pastes of this invention are not limited to the combinations shown in Examples and Application Examples, but may also be used in admixture with other various colored varnishes or clear varnishes.

REFERENTIAL EXAMPLE 1

Preparation of a polyol:

Castor oil (9.3 parts) and 41.0 parts of neopentyl glycol were subjected to ester interchange reaction at 240° C. in a customary manner, and then 23.4 parts of phthalic, anhydride and 26.3 parts of isophthalic acid were added. Esterification was carried out in a customary manner to obtain a polyol.

Thereafter, 62.6 parts of the polyol, 24.4 parts of hexamethoxymethylolmelamine, 13.1 parts of neopentyl glycol and 8.0 parts of xylene were subjected to dealcoholization at 120° C. over 1 hour. Then, the nonvolatile content (NV) of the product was adjusted to 70% with ethyl acetate to obtain a polyol having a Gardner viscosity at 25° C. (all viscosities given hereinbelow were Gardner viscosities measured at 25° C.) of Q-R, an acid value of 4.0, and a hydroxyl value of 105.0. This polyol will be abbreviated as polyol (P-1).

REFERENTIAL EXAMPLE 2

Hexamethoxymethylolmelamine (54.2 parts) and 26.8 parts of propylene glycol were subjected to alcoholization reaction at 110° C. for 1 hour. Then 0.1 part of an 80% aqueous solution of formic acid was added, and the mixture was subjected to dealcoholization reaction further at 130° C. for about 15 hours. Thereafter, the nonvolatile content of the reaction product was adjusted to 70% with a mixture of toluene and Cellosolve acetate (8:2 by volume) to give a polyol having a viscosity of N-O and a hydroxyl value of 250.0. This polyol will be abbreviated as polyol (P-2).

REFERENTIAL EXAMPLE 3

Xylene (771 parts) were heated to 110° C., and a mixture composed of 105 parts of beta-hydroxy methacrylate, 695 parts of methyl methacrylate and 72 parts of di-tert-butyl peroxide was polymerized while adding it dropwise to the solvent. Hexamethoxymethylolmelamine (170 parts) and 64 parts of propylene glycol were added to the resulting acrylic resin, and the mixture was subjected to solvent removal and dealcoholization at 110° C. for about 13 hours to obtain a polyol having an NV of 60%, a viscosity of $Z_1$-$Z_2$ and a hydroxyl value of 40. This polyol will be abbreviated as polyol (P-3).

EXAMPLE 1

One hundred parts of polyol (P-1) obtained in Referential Example 1 was preliminarily mixed with 30 parts of "Cyanine Blue NK" (a product of Dainippon Ink and Chemicals, Inc.), and the mixture was kneaded three times on a three roll mill to give a blue pigment paste A having a PWC of 30% and an NV of 89.9%.

EXAMPLE 2

A red pigment paste A having a PWC of 30% and an NV of 91.3% was prepared in the same way as in Example 1 except that 30 parts of "Fastogen Red YN" (a product of Dainippon Ink and Chemicals, Inc.) was used instead of "Cyanine Blue NK".

EXAMPLE 3

A black pigment paste A having a PWC of 30% and an NV of 83.6% was prepared in the same way as in Example 1 except that 30 parts of carbon black was used instead of "Cyanine Blue NK".

EXAMPLE 4

A blue pigment paste B having a PWC of 30% and an NV of 93.2% was prepared in the same way as in Example 1 except that polyol (P-2) was used instead of polyol (P-1).

EXAMPLE 5

A red pigment paste B having a PWC of 30% and an NV of 94.8% was prepared in the same way as in Example 2 except that polyol (P-2) was used instead of polyol (P-1).

EXAMPLE 6

A black pigment paste B having a PWC of 30% and an NV of 87.0% was prepared in the same way as in Example 3 except that polyol (P-2) was used instead of polyol (P-1).

EXAMPLE 7

A blue pigment paste C having a PWC of 30% and an NV of 87.1% was prepared in the same way as in Example 1 except that polyol (P-3) was used instead of polyol (P-1).

EXAMPLE 8

A red pigment paste C having a PWC of 30% and an NV of 88.8% was prepared in the same way as in Example 2 except that polyol (P-3) was used instead of polyol (P-1).

EXAMPLE 9

A black pigment paste C having a PWC of 30% and an NV of 80.9% was prepared in the same way as in Example 3 except that polyol (P-3) was used instead of polyol (P-1).

EXAMPLE 10

One hundred parts of polyol (P-1) was preliminarily mixed with 15 parts of "Cyanine Blue NK" and 15 parts of "Fastogen Red YN", and the mixture was then kneaded three times on a three roll mill to give a mixed color pigment paste D having a PWC of 30% and an NV of 90.6%.

EXAMPLE 11

A mixed color pigment paste E having a PWC of 30% and an NV of 94.0% was prepared in the same way as in Example 10 except that polyol (P-2) was used instead of polyol (P-1).

EXAMPLE 12

A mixed color pigment paste F having a PWC of 30% and an NV of 87.9% was prepared in the same way as in Example 10 except that polyol (P-3) was used instead of polyol (P-1).

APPLICATION EXAMPLES 1-24 AND COMPARATIVE APPLICATION EXAMPLES 1-24

The blue pigment paste, red pigment paste and black pigment paste obtained in the Examples were evaluated.

Each of base resins, i.e. a nitrocellulose lacquer, a two-package curable acrylic urethane resin, a melamine-curable alkyd resin, a melamine-curable oil-free alkyd resin, a melamine-curable acrylic resin, and a melamine-curable polyester-modified acrylic resin, and the pigment and thinner indicated in Table 1 were mixed in the proportions indicated in Table 1. The resulting mixture was subjected to a high-speed dispersing machine using glass beads having a diameter of 1.5 mm in a weight equal to the mixture to prepare a white pigment paste.

The PWC and NV of the pigment paste in each run are shown in Table 2.

TABLE 1

| Mixing proportions (parts) | Run No. 1 | 2 | 3 | 4 | 5 | 6 |
|---|---|---|---|---|---|---|
| Beckosol 1308 (*1) | 200.0 | — | — | — | — | — |
| Beckosol ER-3653-60 (*2) | — | 166.6 | — | — | — | — |
| Acrydic A-801P (*3) | — | — | 200.0 | — | — | — |
| Beckolite 46-119 (*4) | — | — | — | 120.0 | — | — |
| Acrydic A-409 (*5) | — | — | — | — | 200.0 | |
| Acrydic A-405 (*5) | — | — | — | — | — | 200.0 |
| Rutile titanium dioxide | 150.0 | 150.0 | 150.0 | 69.9 | 150.0 | 150.0 |
| Xylene | 29.6 | — | — | 30.0 | 40.0 | — |
| Toluene | — | 68.0 | 40.0 | — | — | — |
| Mixed solvent (*6) | — | — | — | — | — | 52.0 |

(*1): Alkyd polyol for use in two package urethane paints (a product of Dainippon Ink and Chemicals Inc.)
(*2): Alkyd resin for melamine baking paints (a product of the same company)
(*3): Acrylic polyol for two-package urethane paints (a product of the same company)
(*4): Oil-free alkyd resin for melamine baking paints (a product of the same company)
(*5): Acrylic resin for melamine baking paints (a product of the same company)
(*6): Xylene/"Solvesso #100"/n-butanol/Cellosolve acetate = 4/3/2/1 (by volume)

TABLE 2

| | Run No. 1 | 2 | 3 | 4 | 5 | 6 |
|---|---|---|---|---|---|---|
| PWC (%) | 60.0 | 60.0 | 60.0 | 49.3 | 60.0 | 60.0 |
| NV (%) | 65.8 | 65.0 | 64.1 | 64.5 | 64.1 | 62.2 |
| Designation of the pigment paste | PP-1 | PP-2 | PP-3 | PP-4 | PP-5 | PP-6 |

Each of the same base resins as described above and the pigment and thinner indicated in Table 3 were preliminarily mixed in the proportions shown in Table 3. The mixture was kneaded three times on a three-roll mill. Thus, blue, red and black pigment pastes were prepared. The PWC and NV of these pigment pastes are shown in Table 4.

On the other hand, each of the base resins and the pigments and thinner indicated in Table 5 were preliminarily mixed in the proportions indicated in Table 5, and the mixture was kneaded three times on a three-roll mill. Thus, mixed color pigment pastes were prepared. The PWC and NV of these pigment pastes are shown in Table 6.

TABLE 3

| Mixing proportions (parts) | Run No. 7 | 8 | 9 | 10 | 11 | 12 | 13 | 14 | 15 |
|---|---|---|---|---|---|---|---|---|---|
| Beckosol 1308 | | | | | 100.0 | | | | |
| Beckosol ER-3653-60 | | | | | 100.0 | | | | |
| Acrydic A-801P | | | | | 100.0 | | | | |
| Beckolite 46-119 | | | | | 100.0 | | | | |
| Acrydic A-409 | | | | | 100.0 | | | | |
| Acrydic A-405 | | | | | 100.0 | | | | |
| Cyanine Blue NK | 21.4 | 25.7 | 21.4 | 25.7 | 21.4 | 21.4 | | | |
| Fastogen Red YN | | | | | | | 21.4 | 25.7 | 21.4 |
| Carbon Black | | | | | | | | | |
| Xylene | 20.0 | | | 40.0 | 30.0 | | 20.0 | | |
| Toluene | | 50.0 | 30.0 | | | | | 50.0 | 30.0 |
| Mixed solvent | | | | | | 30.0 | | | |
| Designation of the pigment paste | PP-7 | PP-8 | PP-9 | PP-10 | PP-11 | PP-12 | PP-13 | PP-14 | PP-15 |

| Mixing proportions (parts) | Run No. 16 | 17 | 18 | 19 | 20 | 21 | 22 | 23 | 24 |
|---|---|---|---|---|---|---|---|---|---|
| Beckosol 1308 | | | | | 100.0 | | | | |
| Beckosol ER-3653-60 | | | | | 100.0 | | | | |
| Acrydic A-801P | | | | | 100.0 | | | | |
| Beckolite 46-119 | | | | | 100.0 | | | | |
| Acrydic A-409 | | | | | 100.0 | | | | |
| Acrydic A-405 | | | | | 100.0 | | | | |
| Cyanine Blue NK | | | | | | | | | |
| Fastogen Red YN | 25.7 | 21.4 | 21.4 | | | | | | |
| Carbon Black | | | | 21.4 | 25.7 | 21.4 | 25.7 | 21.4 | 21.4 |
| Xylene | 40.0 | 30.0 | | 30.0 | | | 70.0 | | |
| Toluene | | | 30.0 | | 50.0 | 40.0 | | 70.0 | |
| Mixed solvent | | | | | | | | | 70.0 |
| Designation of the pigment paste | PP-16 | PP-17 | PP-18 | PP-19 | PP-20 | PP-21 | PP-22 | PP-23 | PP-24 |

TABLE 4

| Run No. | Designation of the pigment paste | PWC (%) | NV (%) |
|---|---|---|---|
| 7 | PP-7 | 30.0 | 52.2 |
| 8 | PP-8 | | 53.4 |
| 9 | PP-9 | | 52.2 |
| 10 | PP-10 | | 53.8 |
| 11 | PP-11 | | 49.0 |
| 12 | PP-12 | | 49.6 |
| 13 | PP-13 | | 50.4 |
| 14 | PP-14 | | 50.7 |
| 15 | PP-15 | | 50.4 |
| 16 | PP-16 | | 51.0 |
| 17 | PP-17 | | 49.0 |
| 18 | PP-18 | | 49.6 |
| 19 | PP-19 | | 48.6 |
| 20 | PP-20 | | 48.3 |
| 21 | PP-21 | | 48.6 |
| 22 | PP-22 | | 40.0 |
| 23 | PP-23 | | 40.0 |
| 24 | PP-24 | | 40.0 |

TABLE 5

| Mixing proportions (parts) | Run No. 25 | 26 | 27 | 28 | 29 | 30 |
|---|---|---|---|---|---|---|
| Beckosol 1308 | 100 | | | | | |
| Beckosol ER-3653-60 | | 100 | | | | |
| Acrydic A-801P | | | 100 | | | |
| Beckolite 46-119 | | | | 100 | | |

TABLE 5-continued

| Mixing proportions (parts) | Run No. 25 | 26 | 27 | 28 | 29 | 30 |
|---|---|---|---|---|---|---|
| Acrydic A-409 | | | | | 100 | |
| Acrydic A-405 | | | | | | 100 |
| Cyanine Blue NK | 10.7 | 12.8 | 10.7 | 12.8 | 10.7 | 10.7 |
| Fastogen Red YN | 10.7 | 12.8 | 10.7 | 12.8 | 10.7 | 10.7 |
| Xylene | 20.0 | | | 40.0 | 30.0 | |
| Toluene | | 50.0 | 30.0 | | | |
| Mixed solvent | | | | | | 30.0 |

TABLE 6

| | Run No. 25 | 26 | 27 | 28 | 29 | 30 |
|---|---|---|---|---|---|---|
| PWC (%) | | | 30.0 | | | |
| NV (%) | 51.3 | 52.0 | 51.3 | 52.4 | 49.0 | 49.6 |
| Designation of the pigment paste | PP-25 | PP-26 | PP-27 | PP-28 | PP-29 | PP-30 |

To evaluate the pigment pastes obtained as above, each of the white pigment pastes was mixed with the blue, red or black pigment paste prepared from the same base resin as the white pigment paste to obtain a pale blue, pink or gray pigment paste. The base resin of the paste was cured under the conditions indicated in Tables 7-1 and 7-2, and the resulting cured coated film or the resulting ink film was tested for floating or gloss.

The results are shown in Tables 7-1 and 7-2.

As can be seen from the data shown in Tables 7-1 and 7-2, the pigment pastes of this invention, when mixed with any types of base resins give coated film or ink films having better color separation and high gloss than do pigment pastes obtained by using the same resins as the base resins. It is also seen that only those pigment pastes which have sufficient compatibility with the base resins and good pigment dispersibility give coated films or ink films being free from floating and having excellent gloss.

TABLE 7

| Application Example | Mixing proportions: Base resin | | White pigment paste | | Colored pigment paste (5) | | Mixed colored pigment paste (6) | | Nitro-cellulose | (1) Super Beckamine L-117-60 | Burnock DN-950 (2) | Curing conditions (temperature-time) | Properties: Floating (3) | Glass (4) |
|---|---|---|---|---|---|---|---|---|---|---|---|---|---|---|
| 1 | Beckosol 1308 | 5.9 | PP-1 | 77.8 | BluA | 16.3 | | | 42.9 | | | 20° C.-24 hrs | | 84.7 |
| 2 | Beckosol ER-3653-60 | 27.3 | PP-2 | 60.2 | " | 12.4 | | | | 25.0 | | 130° C.-20 min | | 91.7 |
| 3 | Acrydic A-801P | 24.8 | PP-3 | 62.5 | " | 12.7 | | | | | 44.7 | 20° C.-72 hrs | | 90.3 |
| 4 | Beckolite 46-119 | 25.7 | PP-4 | 61.7 | " | 12.6 | | | | 33.3 | | 150° C.-20 min | | 90.3 |
| 5 | Acrydic A-409 | 29.2 | PP-5 | 58.8 | " | 12.0 | | | | 33.3 | | " | | 89.8 |
| 6 | Acrydic A-405 | 30.3 | PP-6 | 58.2 | " | 11.5 | | | | 25.0 | | 130° C.-20 min | | 92.1 |
| 7 | Beckosol 1308 | 5.9 | PP-1 | 78.0 | RedA | 16.1 | | | 42.9 | | | 20° C.-24 hrs | | 80.4 |
| 8 | Beckosol ER-3653-60 | 27.4 | PP-2 | 60.3 | " | 12.3 | | | | 25.0 | | 130° C.-20 min | | 88.8 |
| 9 | Acrydic A-801P | 24.8 | PP-3 | 62.6 | " | 12.6 | | | | | 44.7 | 20° C.-72 hrs | | 88.9 |
| 10 | Beckolite 46-119 | 25.7 | PP-4 | 61.8 | " | 12.5 | | | | 33.3 | | 150° C.-20 min | | 79.8 |
| 11 | Acrydic A-409 | 29.2 | PP-5 | 58.9 | " | 11.8 | | | | 33.3 | | " | | 86.2 |
| 12 | Acrydic A-405 | 30.4 | PP-6 | 58.3 | " | 11.3 | | | | 25.0 | | 130° C.-20 min | | 89.1 |
| 13 | Beckosol 1308 | | PP-1 | 98.4 | BlaA | 1.6 | | | 42.9 | | | 20° C.-24 hrs | | 83.2 |
| 14 | Beckosol ER-3653-60 | 30.8 | PP-2 | 68.1 | " | 1.1 | | | | 40.3 | | 130° C.-20 min | | 90.8 |
| 15 | Acrydic A-801P | 30.8 | PP-3 | 68.1 | " | 1.0 | | | | | 41.9 | 20° C.-72 hrs | | 91.9 |
| 16 | Beckolite 46-119 | 30.4 | PP-4 | 68.5 | " | 1.1 | | | | 41.0 | | 150° C.-20 min | | 89.2 |
| 17 | Acrydic A-409 | 34.3 | PP-5 | 64.7 | " | 1.0 | | | | 41.0 | | " | | 94.3 |
| 18 | Acrydic A-405 | 33.9 | PP-6 | 65.2 | " | 1.0 | | | | 40.3 | | 130° C.-20 min | | 92.8 |
| 19 | Beckosol 1308 | 5.9 | PP-1 | 77.9 | | | D | 16.2 | 42.9 | | | 20° C.-24 hrs | | 82.5 |
| 20 | Beckosol ER-3653-60 | 27.4 | PP-2 | 60.2 | | | " | 12.4 | | 25.0 | | 130° C.-20 min | | 90.0 |
| 21 | Acrydic A-801P | 24.8 | PP-3 | 62.5 | | | " | 12.7 | | | 44.7 | 20° C.-72 hrs | | 89.6 |
| 22 | Beckolite 46-119 | 25.7 | PP-4 | 61.8 | | | " | 12.5 | | 33.3 | | 150° C.-20 min | | 85.0 |
| 23 | Acrydic A-409 | 29.2 | PP-5 | 58.8 | | | " | 12.0 | | 33.3 | | " | — | 86.5 |
| 24 | Acrydic A-405 | 30.4 | PP-6 | 58.2 | | | " | 11.2 | | 25.0 | | 130° C.-20 min | | 91.0 |
| 1 | Beckosol 1308 | 38.2 | PP-1 | 45.4 | BluA | 16.4 | | | 42.9 | | | 20° C.-24 hrs | | 84.8 |
| 2 | Beckosol ER-3653-60 | 32.7 | PP-2 | 49.6 | " | 17.7 | | | | 42.9 | | 130° C.-20 min | | 90.4 |
| 3 | Acrydic A-801P | 38.1 | PP-3 | 45.8 | " | 16.1 | | | | | 44.7 | 20° C.-72 hrs | — | 90.5 |
| 4 | Beckolite 46-119 | 34.2 | PP-4 | 48.6 | " | 17.2 | | | | 33.3 | | 150° C.-20 min | | 84.3 |
| 5 | Acrydic A-409 | 37.5 | PP-5 | 46.2 | " | 16.2 | | | | 33.3 | | " | | 85.6 |
| 6 | Acrydic A-405 | 36.0 | PP-6 | 47.7 | " | 16.3 | | | | 42.9 | | 130° C.-20 min | | 90.9 |
| 7 | Beckosol 1308 | 37.5 | PP-1 | 45.5 | RedA | 17.0 | | | 42.9 | | | 20° C.-24 hrs | | 81.9 |
| 8 | Beckosol ER-3653-60 | 32.0 | PP-2 | 49.8 | " | 18.2 | | | | 42.9 | | 130° C.-20 min | | 87.8 |
| 9 | Acrydic A-801P | 37.4 | PP-3 | 45.9 | " | 16.7 | | | | | 44.7 | 20° C.-72 hrs | | 89.5 |
| 10 | Beckolite 46-119 | 33.5 | PP-4 | 48.9 | " | 17.7 | | | | 33.3 | | 150° C.-20 min | | 84.4 |
| 11 | Acrydic A-409 | 36.9 | PP-5 | 46.0 | " | 17.2 | | | | 33.3 | | " | | 85.3 |
| 12 | Acrydic A-405 | 35.5 | PP-6 | 47.5 | " | 17.0 | | | | 42.9 | | 130° C.-20 min | | 89.0 |
| 13 | Beckosol 1308 | 46.4 | PP-1 | 52.2 | BlaA | 1.4 | | | 42.9 | | | 20° C.-24 hrs | | 81.3 |
| 14 | Beckosol ER-3653-60 | 42.6 | PP-2 | 55.9 | " | 1.5 | | | | 40.3 | | 130° C.-20 min | — | 90.7 |
| 15 | Acrydic A-801P | 45.1 | PP-3 | 53.2 | " | 1.7 | | | | | 41.9 | 20° C.-72 hrs | — | 93.3 |
| 16 | Beckolite 46-119 | 42.3 | PP-4 | 55.9 | " | 1.8 | | | | 41.0 | | 150° C.-20 min | | 91.4 |
| 17 | Acrydic A-409 | 46.7 | PP-5 | 51.7 | " | 1.7 | | | | 41.0 | | " | — | 89.0 |
| 18 | Acrydic A-405 | 40.4 | PP-6 | 57.8 | " | 1.8 | | | | 40.3 | | 130° C.-20 min | — | 93.1 |
| 19 | Beckosol 1308 | 38.0 | PP-1 | 45.5 | | | D | 16.8 | 42.5 | | | 20° C.-24 hrs | | 83.1 |
| 20 | Beckosol ER-3653-60 | 31.5 | PP-2 | 49.8 | | | " | 17.9 | | 43.0 | | 130° C.-20 min | | 89.0 |
| 21 | Acrydic A-801P | 37.5 | PP-3 | 45.6 | | | " | 16.5 | | | 45.0 | 20° C.-72 hrs | — | 89.6 |
| 22 | Beckolite 46-119 | 33.9 | PP-4 | 48.7 | | | " | 17.8 | | 33.5 | | 150° C.-20 min | — | 84.4 |
| 23 | Acrydic A-409 | 37.1 | PP-5 | 46.5 | | | " | 16.6 | | 33.5 | | " | | 85.6 |

TABLE 7-continued

| Application Example | Mixing proportions: Base resin | | White pigment paste | | Colored pigment paste (5) | Mixed colored pigment paste (6) | | Nitro-cellulose | (1) Super Beckamine L-117-60 | Burnock DN-950 (2) | Curing conditions (temperature-time) | Properties: Floating (3) | Glass (4) |
|---|---|---|---|---|---|---|---|---|---|---|---|---|---|
| 24 | Acrydic A-405 | 36.0 | PP-6 | 47.7 | | " | 16.8 | | 43.2 | | 130° C.-20 min | | 90.1 |

Notes to Table 7
(1): Butyl-etherified melamine resin (VN = 60%) made by Dainippon Ink and Chemicals, Inc.
(2): Isocyanate prepolymer (NV = 75%) made by the same company as above.
(3): Evaluated visually on the following standards.
· : no color separation at all
: slight color separation
Δ: considerable color separation
X: marked color separation
(4): 60° reflection gloss (%)
(5): BluA is the blue pigment paste A obtained in Example 1.
RedA is the red pigment paste A obtained in Example 2.
BlaA is the black pigment paste A obtained in Example 3.
(6): D is the mixed colored pigment obtained in Example 10.

What is claimed is:

1. A pigment paste comprising a pigment and as a pigment dispersing agent, a *non-water-soluble* compound having a basic structure represented by the following formula

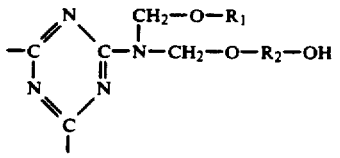

wherein $R_1$ represents a hydrogen atom or a $C_1$–$C_4$ alkyl group, and $R_2$ represents a residue of a diol or polyol *selected from the group consisting of ethylene glycol, propylene glycol, diethylene glycol, dipropylene glycol, polypropylene glycol, butanediol, pentanediol, neopentyl glycol, hexandiol, 2,2,4-trimethyl-1,3-pentanediol, bisphenols, hydrogenated bisphenols, halogenated bisphenols, adducts of a diol with an alkylene oxide, polyester diols, hydroxyl-containing fatty acid ester polyols, esters of higher fatty acids with a polyol, esters of higher fatty acids with an epoxy compound, castor oil, alkyl polyols and acrylic polyols,* or a mixture of said pigment dispersing agent and an organic solvent, said pigment being dispersed in said pigment dispersing agent or in said mixture in an amount such that the pigment weight concentration (PWC, weight %) as defined by $$PWC(\%) = \frac{\text{Weight of the pigment}}{\text{Weight of the pigment dispersing agent + solids weight of the pigment}} \times 100$$

is 0.5 to 99.5% by weight.

2. The pigment paste of claim 1 wherein the pigment dispersing agent is a derivative of a triazine-type amino compound, said derivative having a number average molecular weight in the range of 550 to 3,000.

3. The pigment paste of claim 1 wherein the pigment dispersing agent is a derivative of a triazine-type amino compound, said derivative having a hydroxyl value of 20 to 400.

4. The pigment of claim 1 wherein the pigment dispersing agent is a derivative of a triazine-type compound, which is obtained by co-condensing the triazine-type amino compound, formaldehyde, a diol and a monohydric alcohol.

5. The pigment paste of claim 4 wherein said triazine-type amino compound is selected from the group consisting of melamine, benzoguanamine, acetoguanamine, formoguanamine, propioguanamine and isopropylguanamine.

6. The pigment paste of claim 5 wherein said triazone-type amino compound is melamine.

7. The pigment paste of claim 4 wherein an additional aldehyde is added.

8. The pigment paste of claim 7 wherein said additional aldehyde is selected from the group consisting of acetaldehyde, propionaldehyde, glyoxal, succinic aldehyde and chloral.

9. The pigment paste of claim 1 wherein the pigment is at least one pigment selected from the group consisting of azoic pigments, condensed azoic pigments, phthalocyanine pigments, quinacridone pigments, isoindolinone pigments, perylene pigments, perinone pigments, dioxazine pigments, vat dyed pigments, basic dyed pigments, carbon black, titanium oxide, chrome yellow, cadmium yellow, cadmium red, iron oxide red, black iron oxide, zinc white, prussian blue and ultra-marine blue.

10. The pigment paste of claim 1 wherein the pigment is a combination of different pigments.

*11. The pigment paste of claim 1 which comprises the mixture of the pigment dispersing agent and an organic solvent.*

*12. The pigment paste of claim 1 which comprises a dry mixture of a pigment and the pigment dispersing agent.*

* * * * *